United States Patent [19]
Langenbrunner

[11] Patent Number: 5,900,093
[45] Date of Patent: May 4, 1999

[54] METHOD FOR STRETCHING AND MOUNTING FILMS

[76] Inventor: James Roybal Langenbrunner, 1024 Osage Cir., Santa Fe, N.M. 87501

[21] Appl. No.: 08/929,391

[22] Filed: Sep. 15, 1997

Related U.S. Application Data

[60] Continuation of application No. 08/504,125, Jul. 19, 1995, abandoned, which is a division of application No. 08/161,331, Dec. 3, 1993, Pat. No. 5,449,429.

[51] Int. Cl.$^6$ .................................................. B32B 31/00

[52] U.S. Cl. .............................................. 156/229; 156/270

[58] Field of Search .................................... 156/229, 270

[56] References Cited

U.S. PATENT DOCUMENTS

| | | | |
|---|---|---|---|
| 2,505,430 | 4/1950 | Roberts | 156/229 |
| 2,620,289 | 12/1952 | Douglas | 154/106 |
| 3,322,598 | 5/1967 | Marks | 156/229 |
| 3,325,329 | 6/1967 | Bolesky | 156/229 |
| 3,971,687 | 7/1976 | Greer | 156/221 |
| 4,463,055 | 7/1984 | Hodges | 428/458 |
| 4,684,424 | 8/1987 | Augason | 156/163 |
| 5,125,994 | 6/1992 | Harasta | 156/160 |

*Primary Examiner*—Jenna Davis
*Attorney, Agent, or Firm*—Samuel M. Freund

[57] ABSTRACT

Method for stretching and mounting films. An apparatus for stretching films over a flat surface utilizing a vacuum applied to the film surface near the periphery of the film to be stretched is described. Fragile films may be stretched by the present apparatus by attaching such films near their outer edges to a film which is stretched by the apparatus.

1 Claim, 4 Drawing Sheets

METHOD FOR STRETCHING AND MOUNTING FILMS

This application is a continuation of application Ser. No. 08/504,125 filed on Jul. 19, 1995, now abandoned which is a division of application Ser. No. 08/161,331 filed Dec. 3, 1993, now U.S. Pat. No. 5,449,429.

BACKGROUND OF THE INVENTION

The present invention relates generally to mounting films on substrates, and more particularly, to stretching and mounting fragile films on substrates.

Flexible films are used for conducting electrical charges, radiating energy reflecting incident energy, protecting and beautifying surfaces, and for insulating electric-current carrying wires and sheets, as typical examples. Thin films comprised of living tissue are becoming important for certain surgical procedures. Currently, electronic circuits are being manufactured on thins flexible film materials, since they can then be bent, folded, and twisted, thereby providing design possibilities otherwise impossible to achieve. Furthermore, in many applications, film materials are more uniform and otherwise superior to surface coatings applied by spraying, dipping, or brushing. However, applications of thin or fragile films has been limited since handling such films often introduces wrinkles into the film.

Several methods for mounting films on substrates have been described. Generally, these methods employ thermal bonding and heat and pressure are applied to the film/backing combination in order to remove trapped air and provide a uniform bond. For examples in "Method Of Securing Flexible Sheets To Relatively Stiff Backings," by Donald J. Douglas, U.S. Pat. No. 2,620,289, which issued on Dec. 2, 1952, pressure is applied to the outer surface of a film which has been coated with an adhesive and placed in contact with a backing material in order to cause it to conform to the backing, while air is withdrawn from between the surfaces, by placing the assembly in a vacuum chamber. Heat is then applied to activate and set the adhesive. "Method And Apparatus For Making An Optical Element Having A Dielectric Film," U.S. Pat. No. 4,684,424, which issued to Gordon C. Augason on Aug. 4, 1987, describes an apparatus for sandwiching a film between "O" rings held in "O" ring bearing members and an optical element to be coated, on each-side thereof, and stretching the films across the optical element by squeezing the bearing members together. Tapered surfaces in the "O" ring bearing cause the "O" rings to roll outwardly when the members are squeezed together, thereby stretching the film. The film to be used as a coating is further sandwiched between a Mylar film and the optical element, and air is withdrawn from between the optical element and the coating film in order to assist in removing entrained air and wrinkles. The Mylar is utilized both to press the coating film against the element on both sides thereof and to hold the element in place while the coating film is heated to slightly below its melting temperature so that thermal bonding may take place. The apparatus may be used to stretch a single film as well. In order to achieve the stretching of a film, wing nuts are carefully tightened causing the "O" rings to roll outwardly, while the film is visually observed. A similar process is used for coating optical elements. It should be noted that the coating film is not bonded to the Mylar film. Yet another film stretching procedure is described in U.S. Pat. No. 4,463,055 for "Reflective Film And Method Of Applying Same," which issued on Jul. 19, 1984 to Marvin P. Hodges. Therein, the inventor affixes a thin reflective foil to a polymeric carrier, which is then fitted to a complex surface without rupturing or cracking the foil. The method requires that the foil be laminated to the carrier; that is an adhesive is used to bond the two surfaces together at all points of contact therebetween.

In U.S. Pat. No. 5,125,994, "Thermoforming Method," which issued to Louis P. Harasta et al. on Jun. 30, 1992, the inventors describe the stretching and bonding of an adhesive-coated thermoplastic film to a substrate by vacuum thermoforming. The method combines heating a film, which is rigidly held at its outer dimensions, and reducing the pressure behind it in order to cause the film to cover the surface of the substrate and bond thereto with a minimum of air entrapment. The combination of heating and applying vacuum to the film causes the film to be stretched.

Accordingly, it is an object of the present invention to provide an apparatus for stretching films utilizing vacuum to generate the tensioning force.

It is another object of the present invention to provide an apparatus for further stretching a film already stretched utilizing vacuum to generate the tensioning force, by utilizing gas pressure to expand the film.

It is yet another object of the present invention to provide a method for stretching films by utilizing a backing film which is stretched.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects and in accordance with the purpose of the present invention, as embodied and broadly described herein, a method for stretching and mounting films includes the steps of attaching the film to be stretched along the outer dimensions thereof to a backing film, and stretching the backing film a chosen amount, whereby the film to be stretched is also stretched.

It is preferred that a substrate be attached to the stretched film within the outer dimensions of the stretched films and that the stretched film be cut around the substrate, thereby releasing the stretched film mounted to the substrate from the backing film.

Benefits and advantages of the present invention include ease of stretching and mounting fragile films without wrinkles and with isotropic uniformity.

BRIEF DESCRIPTION OF THE DRAWINGS

The accompanying drawings, which are incorporated in and form a part of the specification, illustrate four general embodiments of the present invention and, together with the description, serve to explain the principles of the invention.

DETAILED DESCRIPTION OF THE PREFERRED EMBODIMENTS OF THE INVENTION

Briefly, the present invention in its broadest form includes a method for stretching a film by adjustably reducing the pressure in the vicinity of the edges thereof in order to supply the tensioning force. A backing film may be used to stretch films mounted thereon according to the method of the present invention.

Figure 1:
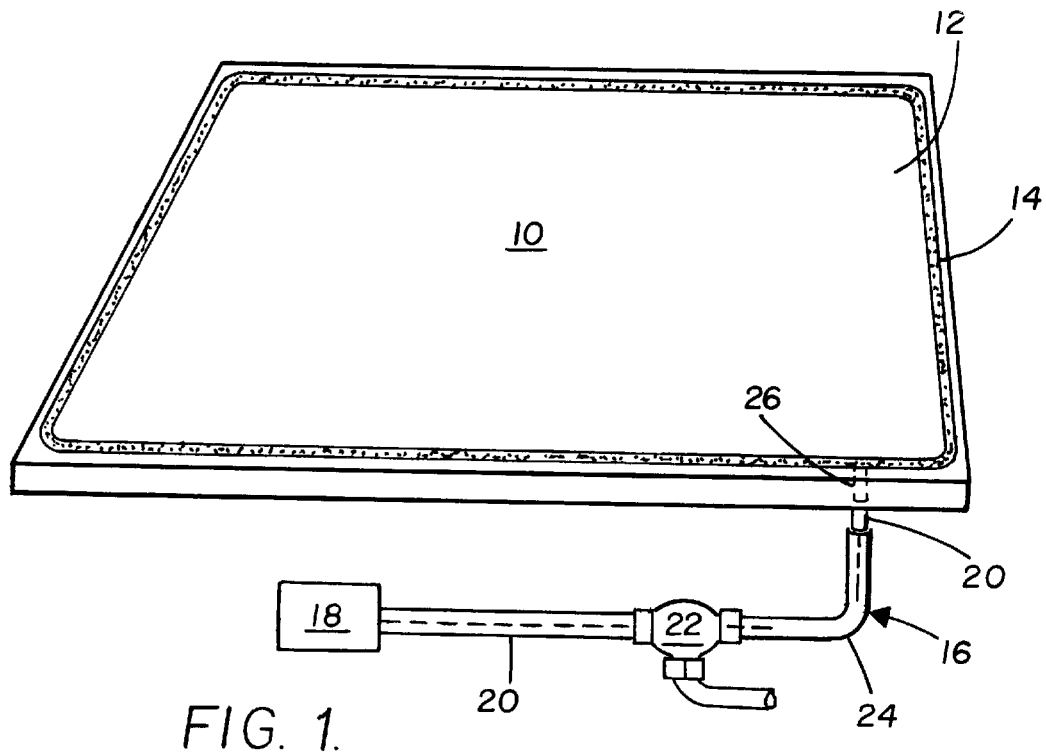
FIG. 1 is a schematic representation of a perspective view of the film stretching apparatus of the present invention illustrating a base having a flat surface, a closed groove fashioned in the surface, and means for evacuating the groove to a chosen vacuum.

Reference will now be made in detail to the present preferred embodiments of the invention, examples of which are illustrated in the accompanying drawings. Identical or similar structure will be identified with identical callouts. FIG. 1 is a schematic representation of a perspective view of an embodiment of the film stretching apparatus of the present invention. Base 10 has a generally flat surface 12 in which a closed groove 14 is fashioned. Acrylic or other plastic materials may be used in the fabrication of the base, as an examples but it is necessary that the construction materials and the thicknesses thereof be sufficiently rigid to withstand the forces required to stretch the films chosen in the practice of the present invention. Groove 14 may be machined in surface 12, or molded therein when base 10 is fabricated. Means 16 are provided to reduce the pressure in groove 14 to a chosen level. Shown in FIG. 1 is vacuum source 18 which reduces the pressure in groove 14 through tube 20, three-way valve 22, and tube 24 through hole 26 in base 10. Three-way valve 22 permits groove 14 to be pressurized, or at least brought back to ambient pressure.

Figure 2:
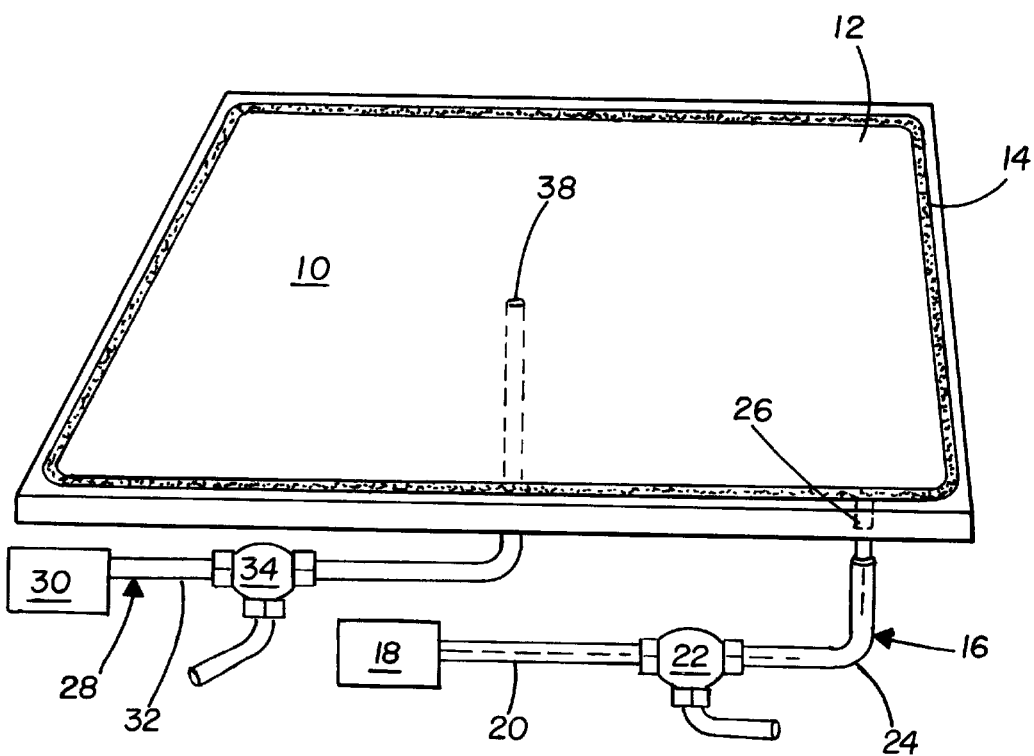
FIG. 2 is a schematic representation of a perspective view of the film stretching apparatus shown in FIG. 1 hereof, further including means for expanding a film.

FIG. 2 is a schematic representation of a perspective view of the film stretching apparatus shown in FIG. 1 hereof, further including means for applying pressure to surface 12 interior to groove 14. Pressure generating source 28 applies pressure by means of pressure generator 30, through tube 32, three-way valve 34, and tube 36 to hole 38 in base 10, Three-way valve 34 permits the pressure applied to surface 12 to be restored to ambient pressure.

Figure 3:
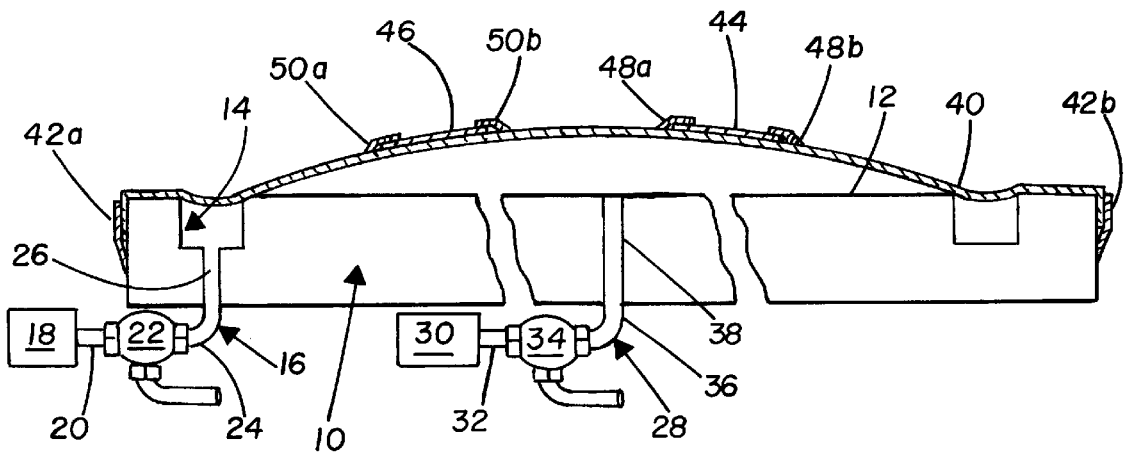
FIG. 3 shows a side cutaway view of the base of the present invention shown in FIG. 2 hereof, illustrating its use in expanding a film.

FIG. 3 shows a side cutaway view of the base of the present invention shown in FIG. 2 hereof, illustrating its use in expanding a film. As an illustration of the use of the subject invention, backing film 40 is fastened using tape 42 (illustrated as 42a,b; the front and rear portions of tape 42 not being shown) to the side of base 10. Films 44 and 46 are fastened to the surface of film 40 using tape 48a,b and 50a,b, respectively (again, the front and rear portions of the tape are not illustrated in the Figure), in the vicinity of the periphery of films 46 and 48. A vacuum is applied to groove 14, which stretches backing film 40 a desired amount, thereby stretching films 42 and 44. Pressure is then applied through hole 38 to further stretch backing film 40 and films 44 and 46. Clearly, if further stretching is not required, films 44 and 46 may be stretched using the basic apparatus illustrated in FIG. 1 hereof; that is, by applying a vacuum to groove 14, which stretches backing film 40 a desired amount.

Figure 4:
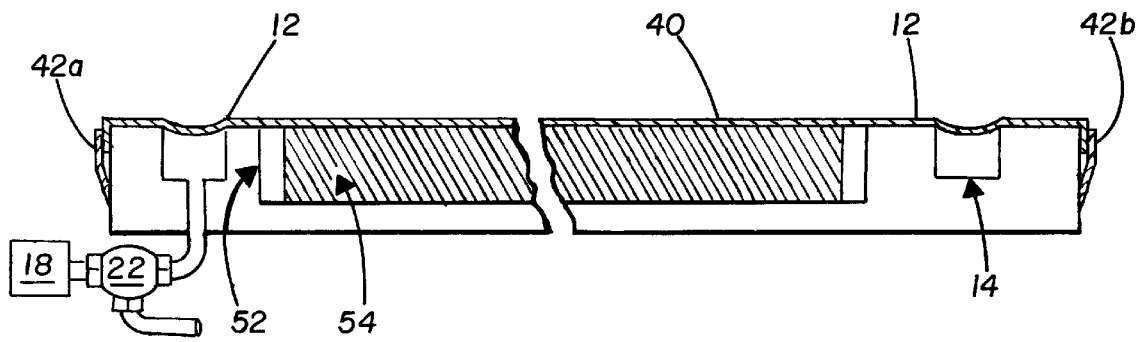
FIG. 4 shows a side cutaway view of the film stretching apparatus shown in FIG. 1 hereof, wherein the flat surface of the base is relieved to accomodate a substrate upon which the stretched film may be mounted.

FIG. 4 shows a side cutaway view of the film stretching apparatus shown in FIG. 1 hereof, wherein the flat surface of the base is relieved 52 to accommodate a substrate 54 upon which stretched film 40 may be mounted. In the use of this embodiments no backing film is employed; rather, film 40 is the film which is desired to be stretched.

Figure 5:
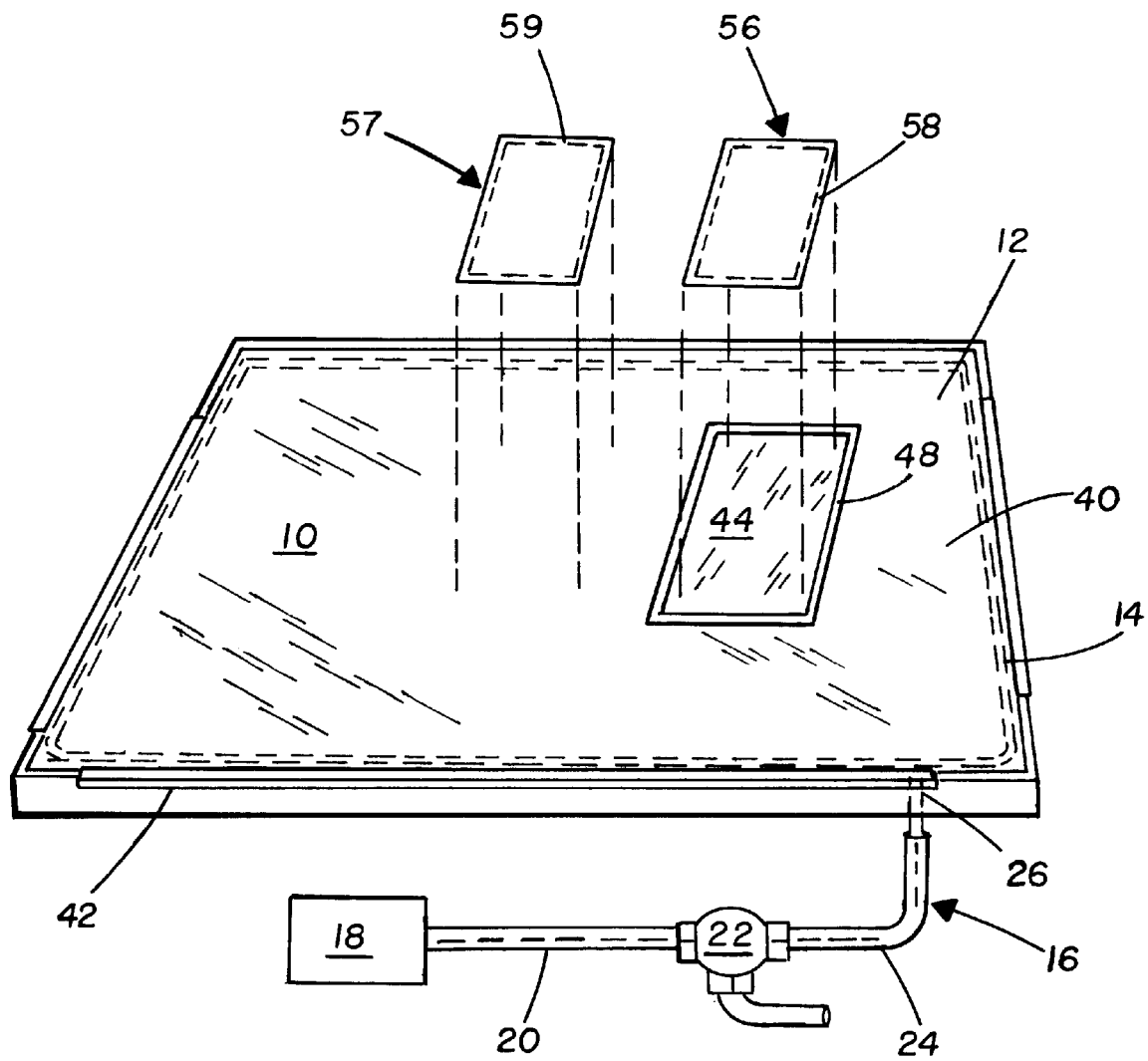
FIG. 5 shows two ways in which the apparatus of the present invention may be utilized to stretch films, which may then be mounted on a substrate.

FIG. 5 shows two ways in which the apparatus of the present invention may be utilized to stretch films, which may then be mounted on a substrate. Fragile film 44 is taped to backing film 40 and stretched as backing film 40 is stretched using the apparatus of the present invention. Substrate 56 is then attached to film 44 by means of adhesive 58 located on the surface thereof facing film 44, and film 44 is removed from backing film 40 by cutting film 44 inside tape 48 or by removing tape 48. It should be mentioned that film 44 may be attached to backing film 40 by use of an adhesive in place of tape 48. It is also contemplated that it might be desirable to mount a portion of film 40 onto a substrate from above. Shown in FIG. 5 is substrate 57 having adhesive 59 located on the surface thereof facing film 40 which may be used for this purpose. Film 40 would be cut along the edges of substrate 57 after adhesive 59 sets up, in order to release the mounted film.

Figure 6:
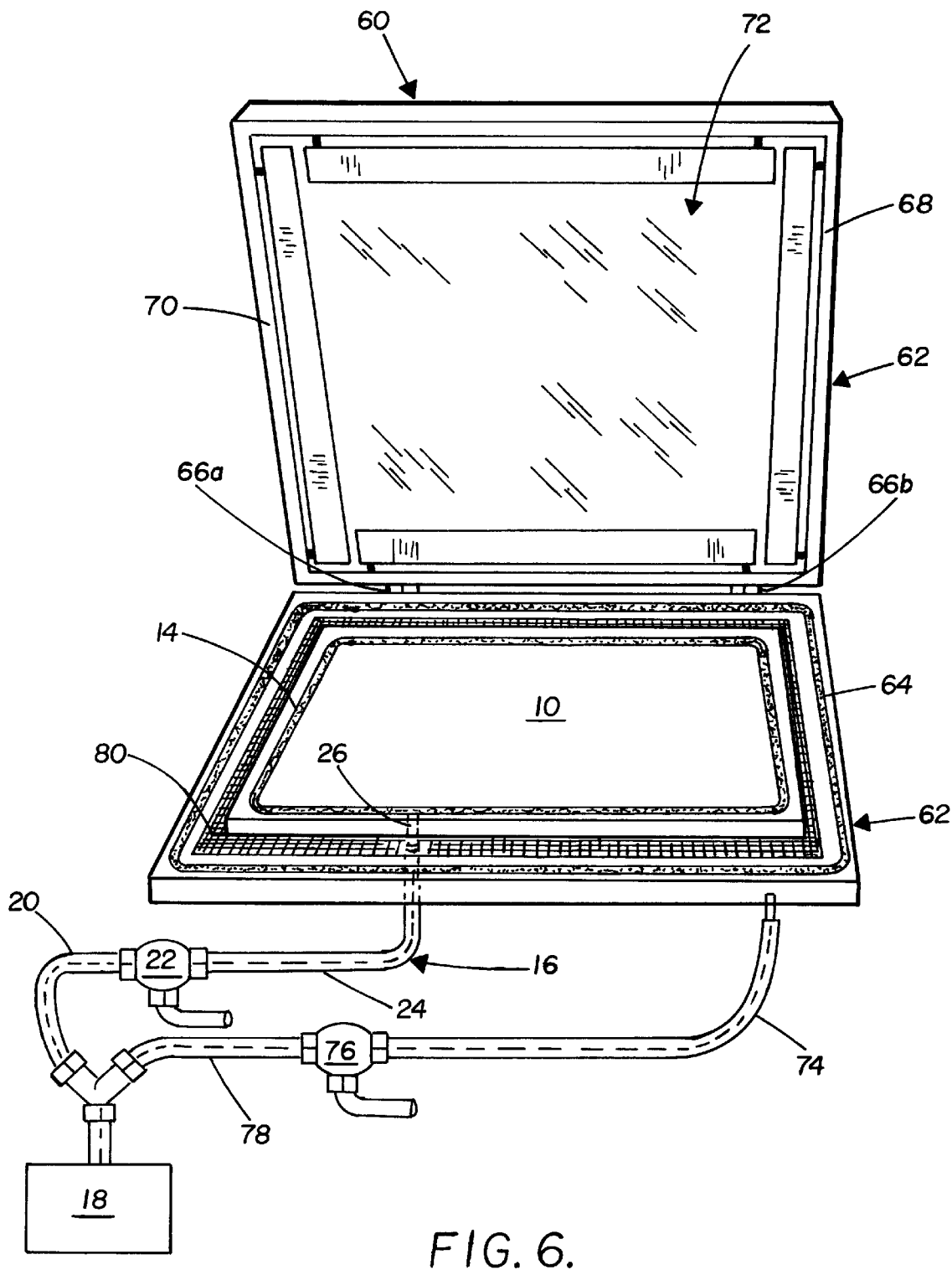
FIG. 6 is a schematic representation of another embodiment of the present invention illustrating enclosing the base shown in FIG. 1 hereof in a flat enclosure which may be evacuated, thereby providing pressure on the surface of the base to assist in removing wrinkles from the film to be stretched.

FIG. 6 is a schematic representation of another embodiment of the present invention illustrating enclosing the base shown in FIG. 1 hereof in a flat enclosure which may be evacuated, thereby providing pressure on the surface of the base to assist in removing wrinkles from the film to be stretched. The basic enclosure is described in "Method Of Securing Flexible Sheets To Relatively Stiff Backings," by Donald J. Douglas, U.S. Pat. No. 2,620,289, supra, the disclosure of which is hereby incorporated by reference herein. Enclosure 60 includes a base member 62, which has a recess therein for accommodating base 10, an O-ring groove 64 for receiving an O-ring, and hinges 66a,b for permitting convenient opening of cover member 68. Cover member 68 includes a flat sealing surface 70 which opposes O-ring groove 64, providing therewith a vacuum seal when enclosure 60 is evacuated, and a transparent window 72 for viewing base 10 when enclosure 60 is closed. In operation, a backing film and a film to be stretched are stretched according to the method of the present invention described hereinabove. Cover member 68 is then closed and enclosure 60 is evacuated through tube 74 by means of three-way valve 76 and tube 78 by vacuum source 18. The position of base 10 may be adjusted using shim 80 such that window 72 provides a downward force on the backing film employed and likewise on the film to be stretched. The applied force assists in removing wrinkles not removed by the earlier stretching process.

The foregoing description of several preferred embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for stretching films comprising the steps of:
    (a) adhesively attaching a film along the outer dimensions thereof to a backing film;
    (b) stretching the backing film a chosen amount, whereby the film is stretched by the backing film;
    (c) attaching a substrate to the stretched film within the outer dimensions of the stretched film; and
    (d) cutting the stretched film around the substrate, thereby releasing the stretched film from the backing film while the film is attached to the substrate.

* * * * *